J. W. RAY.
BOLL WEEVIL DESTROYER.
APPLICATION FILED NOV. 24, 1917. RENEWED APR. 9, 1919.

1,305,493.  Patented June 3, 1919.

Inventor
J. W. RAY
By H. S. Hill
Attorney

UNITED STATES PATENT OFFICE.

JOHN W. RAY, OF PHILADELPHIA, MISSISSIPPI.

BOLL-WEEVIL DESTROYER.

1,305,493. Specification of Letters Patent. Patented June 3, 1919.

Application filed November 24, 1917, Serial No. 203,689. Renewed April 9, 1919. Serial No. 288,845.

*To all whom it may concern:*

Be it known that I, JOHN W. RAY, a citizen of the United States, residing at Philadelphia, in the county of Neshoba, State of Mississippi, have invented a new and useful Boll-Weevil Destroyer; and I do hereby declare the following to be a full, clear, and exact description of the invention, such as will enable others skilled in the art to which it appertains to make and use the same.

The present invention relates to a boll weevil destroyer, and has for its object to provide a device of this character which embodies novel features of construction whereby it can be readily drawn between two rows of cotton plants and will operate in an effective manner to dislodge and destroy the cotton boll weevils.

Further objects of the invention are to provide a boll weevil destroyer which is comparatively simple and inexpensive in its construction, which can be readily drawn between the rows of cotton and will serve to cultivate the cotton at the same time that the boll weevils are collected and destroyed, and which can be readily adjusted to operate in the most effective manner upon different sizes of cotton plants.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Corresponding and like parts are referred to in the following description and indicated in all the views of the drawings by the same reference characters.

Figure 1:
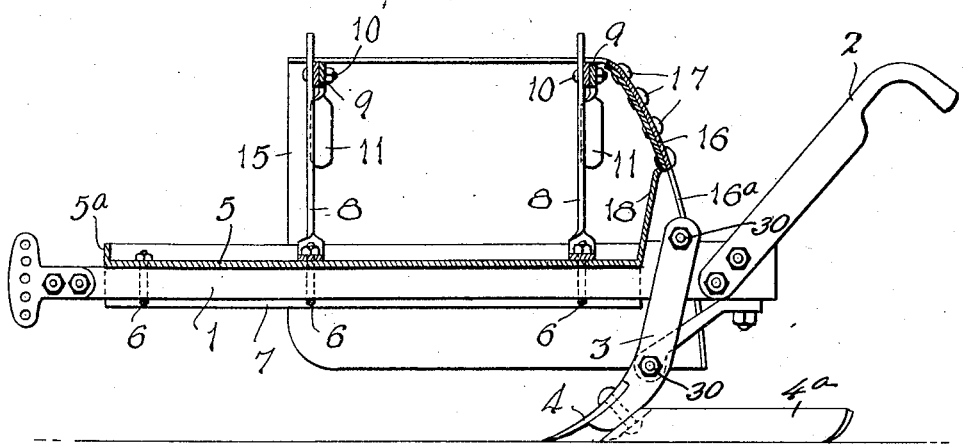
Figure 1 is a vertical longitudinal sectional view through a boll weevil destroyer constructed in accordance with the invention.
Figure 2:
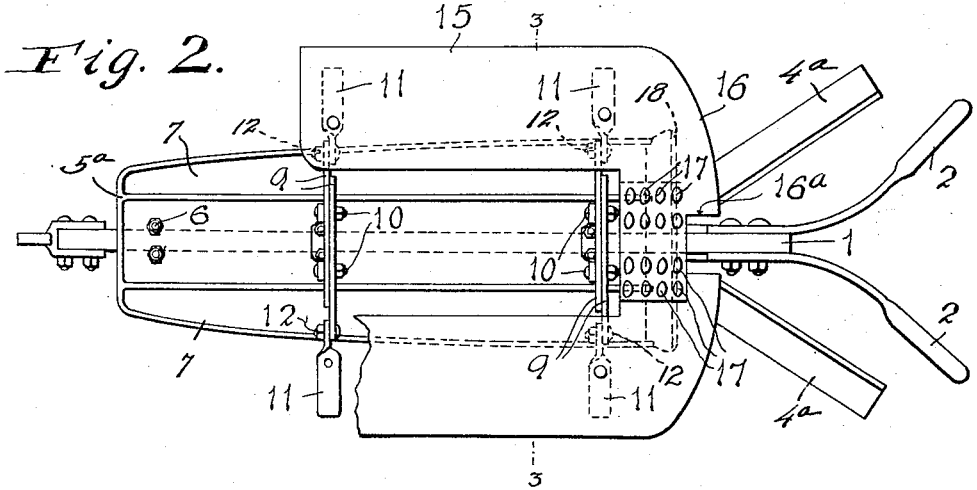
Fig. 2 is a top plan view thereof.
Figure 3:
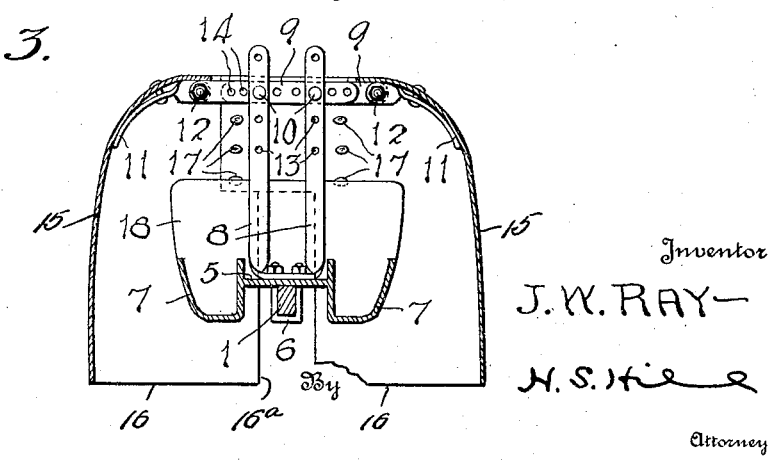
Fig. 3 is a transverse vertical sectional view taken on the line 3—3 of Fig. 2, the plow and members to rear thereof being omitted.

Referring to the drawings, which illustrate one embodiment of the invention, the numeral 1 designates a beam which extends longitudinally of the boll weevil destroyer and is designed to have a horse or other draft animal connected to the forward end thereof. Handles 2 of the conventional construction are secured to the rear end of the beam and incline upwardly therefrom. Secured by bolts 30 to the beam 1 just in advance of the handles 2 is a standard 3 which extends downwardly and is provided with a plow 4 for stirring up the earth between the rows of cotton and cultivating the cotton at the same time that the boll weevils are destroyed. Rearwardly diverging wings 4$^a$ may be secured to the stock at the back of the plow 4, if desired.

A horizontal plate 5 extends longitudinally along the top of the beam 1 and is centrally secured thereto by means of suitable fastening members such as the U-bolts 6. Extending longitudinally along the sides of the plate 5 are shallow troughs 7 which are designed to be filled with tar or oil so that any boll weevils or other forms of insect life falling into the same will be caught and killed. The edges of the troughs 7 extend upwardly above the surface of the plate 5, and flange 5$^a$ is provided at the end of the plate so that, if desired, the upper surface of the plate itself may also be covered with tar or oil for catching and killing the boll weevils falling thereon.

Two pairs of spaced standards 8 project upwardly from the top of the plate 5 at different points in the length thereof and provide means for adjustably supporting the curtain or hood carrying cross bars. Each of the cross bars is formed in two overlapping and complemental sections 9 which are secured to the standards 8 by removable fastening members such as the bolts 10. The outer ends of the respective members 9 of each cross bar have downwardly curved arms 11 hingedly connected thereto by means of clamping bolts 12 which can be tightened to set the arms at any desired angle. The bolts 10 which are employed for securing the cross bars to the standards 8 are designed to pass through selected ones of openings 13 in the standards, depending upon the elevation at which it is desired to mount the cross bars. These bolts 10 also pass through selected ones of openings 14 in the cross bar sections 9, thereby enabling the ends of the cross bar sections to which the curved arms 11 are secured to be projected laterally a greater or less distance, depending upon the distance between the two rows of cotton to be operated upon, or upon the size of the cotton plants themselves. The side curtains or hoods 15 may be formed of any suitable material, such as stiff fabric, and are secured to the curved arms 11 of the cross bars, being arranged so that the lower edges thereof hang downwardly below the horizontal plate 5 and have a spaced and substantially parallel relation to the outer sides of the longitudinal troughs 7. A back curtain 16 connects the rear ends of the side curtains 15, being formed with a cut-out portion 16ª to clear the rear end of the beam 1 and handles 2, and also to provide a clearance opening for the inwardly deflected cotton plants of the two rows as the device is drawn over them. This back curtain 16 may be formed in two sections which overlap each other and are adjustably connected by suitable fasteners 17 so that proper adjustment can be made for moving the side curtains in or out with respect to the troughs or pans 7. A sheet metal wing 18 is inclined upwardly and rearwardly from the rear end of the plate 5 and serves to deflect the boll weevils down upon the plate and into the pan 7 as they are shaken out of the cotton plants during the passage thereof around the sides of the wing and under the back curtain 16.

In the operation of the device the plow 4 is drawn through the space between the two rows of cotton with the side curtains or hoods 15 hanging over the respective cotton plants in the two rows. As the device is advanced the side curtains or hoods 15, in combination with the back curtain or hood 16 will cause the cotton plants to be shaken and agitated, with the result that the boll weevils will be driven out, those of the boll weevils which fall upon the plate 5 or pan 7 being caught and killed by the tar and oil, while those which fall upon the ground will be plowed under and destroyed in this manner. This device has been found very effective in destroying boll weevils, and the curtains or hoods are so mounted that they can be set in the necessary position to act in the most effective manner upon cotton plants of different heights and set out with different spaces between the rows.

Having thus described the invention, what I claim as new and desire to secure by Letters Patent, is:—

1. A boll weevil destroyer including a frame mounted to be drawn between two rows of cotton plants, horizontally disposed pans arranged upon the frame, and longitudinally extending flexible side curtains at the sides of the pans, the upper portions of the side curtains being deflected over the pans, while the lower portions thereof hang in a spaced and parallel relation to the pans so that the plants in the two rows will pass between the pans and the curtains and be agitated to dislodge the boll weevils.

2. A boll weevil destroyer including a frame mounted to be drawn between two rows of cotton plants, horizontally disposed pans arranged upon the frame, and longitudinally extending flexible side curtains at the sides of the pans, the upper portions of the side curtains being deflected inwardly over the pans, while the lower portions thereof hang in a spaced and parallel relation to the pans so that the plants in the two rows will pass between the pans and the curtains and be agitated to dislodge the boll weevils, the rear ends of the side curtains being extended inwardly toward each other at the back of the machine.

3. A boll weevil destroyer including a frame mounted to be drawn between two rows of cotton plants, horizontally disposed pans arranged upon the frame, curtain supports arranged above the pans, means for securing the curtain supports at different elevations, and longitudinally extending flexible side curtains carried by the curtain supports, the upper portions of the curtains being deflected inwardly over the pans, while the lower portions thereof hang in a spaced and parallel relation to the pans so that the plants in the two rows will pass between the pans and the curtains and be agitated to dislodge the boll weevils.

4. A boll weevil destroyer including a frame mounted to be drawn between two rows of cotton plants, horizontally disposed pans arranged upon the frame, curtain supports arranged above the pans and movable in and out with respect thereto, means for holding the curtain supports in an adjusted position, and longitudinally extending flexible side curtains carried by the curtain supports, the upper portions of the side curtain being deflected inwardly over the pans, while the lower portions thereof hang in a spaced and parallel relation to the sides of the pans so that the plants in the two rows will pass between the pans and the curtains and be agitated to dislodge the boll weevils.

5. A boll weevil destroyer including a frame mounted to be drawn between the two rows of cotton plants, horizontally disposed pans arranged upon the frame, curtain supports arranged above the pans and movable in and out with respect thereto, means for securing the curtain supports at different elevations above the pans, and longitudinally extending flexible side curtains carried by the curtain supports, the upper portions of the side curtains being deflected inwardly over the pans, while the lower portions thereof hang in a spaced and parallel relation to the pans so that the plants in the two rows will pass between the pans and the curtains and be agitated to dislodge the boll weevils.

6. A boll weevil destroyer including a frame mounted to be drawn between two rows of cotton plants, horizontally disposed pans arranged upon the frame, standards projecting upwardly from the frame, cross bars mounted upon the standards, curtain supporting arms adjustably secured to the ends of the cross bars, and longitudinally extending flexible side curtains carried by the curtain supporting arms, the upper portions of the side curtains being deflected inwardly over the pans, while the lower portions thereof hang in a spaced and parallel relation to the pans, so that the plants in the two rows will pass between the pans and the curtains and be agitated to dislodge the boll weevils.

7. A boll weevil destroyer including a frame mounted to be drawn between two rows of cotton plants, horizontally disposed pans arranged upon the frame, standards extending upwardly from the frame, extensible cross bars adjustable at different elevations upon the standards and constructed to have the ends thereof projected laterally different distances, curtain supporting arms adjustably mounted upon the ends of the cross bars, and longitudinally extending flexible side curtains carried by the curtain supporting arms, the upper portions of the side curtains being deflected inwardly over the pans, while the lower portions thereof hang in a spaced and parallel relation to the pans so that the plants in the two rows will pass between the pans and the curtains and be agitated to dislodge the boll weevils.

8. A boll weevil destroyer including a frame mounted to be drawn between two rows of cotton plants, horizontally disposed pans arranged above the frame, curtain supports arranged above the pans, means for securing the curtain supports at different elevations, flexible longitudinal side curtains carried by the curtain supports and hanging in a spaced and parallel relation to the pans so that the plants in the two rows will pass between the pans and the curtain and be agitated to dislodge the boll weevils, the rear ends of the side curtains being extended inwardly toward each other at the back of the machine.

In testimony whereof I have signed my name to this specification in the presence of two subscribing witnesses.

JOHN W. RAY.

Witnesses:
 JONES BRANTLEY,
 H. L. RAY.

Copies of this patent may be obtained for five cents each, by addressing the "Commissioner of Patents, Washington, D. C."